US011523365B2

(12) United States Patent
Cui et al.

(10) Patent No.: US 11,523,365 B2
(45) Date of Patent: *Dec. 6, 2022

(54) INTER-RADIO ACCESS TECHNOLOGY POSITIONING MEASUREMENTS IN NEW RADIO SYSTEMS

(71) Applicant: Intel Corporation, Santa Clara, CA (US)

(72) Inventors: Jie Cui, Santa Clara, CA (US); Yi Guo, Shanghai (CN); Yang Tang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/951,798

(22) Filed: Nov. 18, 2020

(65) Prior Publication Data

US 2021/0084608 A1 Mar. 18, 2021

Related U.S. Application Data

(63) Continuation of application No. 16/372,139, filed on Apr. 1, 2019, now Pat. No. 10,880,857.

(Continued)

(51) Int. Cl.
*H04W 64/00* (2009.01)
*G01S 5/02* (2010.01)
(Continued)

(52) U.S. Cl.
CPC ......... *H04W 64/003* (2013.01); *G01S 5/0236* (2013.01); *H04W 24/10* (2013.01); *H04W 64/00* (2013.01); *H04W 48/10* (2013.01)

(58) Field of Classification Search
CPC ... H04W 64/00; H04W 24/10; H04W 64/003; H04W 48/10; H04W 88/00; H04W 88/02; H04W 88/06; H04W 88/08; H04W 88/18; H04W 92/00; H04W 92/02; H04W 92/04; H04W 92/10; H04W 92/16; H04W 76/00; H04W 76/11; H04W 76/16; H04W 40/20; H04W 4/02; H04W 4/029; H04W 4/50; H04W 74/002; H04W 74/004; H04W 74/006; H04W 74/02; H04W 28/0226; H04W 28/0804; H04W 36/00; H04W 36/14; H04W 36/24; H04W 36/34;
(Continued)

(56) References Cited

U.S. PATENT DOCUMENTS 8,249,580 B2 8/2012 Drewes et al.
10,355,766 B2 7/2019 Lee et al.
(Continued)

OTHER PUBLICATIONS

Qualcomm Incorporated, "Presentation of Specification/Report to TSG: TS 38.305, Version 1.0.0," 3GPP TSG-RAN Meeting #79, Tdoc RP-180171, Agenda item: 9.2.1.2, Mar. 19-22, 2018, Chennai, India, 1 page.

(Continued)

*Primary Examiner* — Meless N Zewdu
(74) *Attorney, Agent, or Firm* — Schwabe, Williamson & Wyatt, P.C.

(57) ABSTRACT

Embodiments of the present disclosure describe signaling of positioning measurement indications or measurement gap requests. Other embodiments may be described and claimed.

22 Claims, 10 Drawing Sheets

Related U.S. Application Data

(60) Provisional application No. 62/651,500, filed on Apr. 2, 2018.

(51) Int. Cl.
*H04W 24/10* (2009.01)
*H04W 48/10* (2009.01)

(58) Field of Classification Search
CPC .... H04W 28/0819; G01S 5/02; G01S 5/0236; G01S 5/10; G01S 5/0036; G01S 5/0045; G01S 5/0054; G01S 5/0063; G01S 5/009; G01S 5/0009; G01S 5/0018; G01S 5/0027; G01S 5/0249
USPC ..................................................... 455/456.1
See application file for complete search history.

(56) References Cited

U.S. PATENT DOCUMENTS

| | | | |
|---|---|---|---|
| 10,470,068 B2* | 11/2019 | Yiu et al. | H04W 24/10 |
| 2008/0189970 A1* | 8/2008 | Wang et al. | 33/701 |
| 2012/0083221 A1 | 4/2012 | Ranta-Aho et al. | |
| 2012/0149431 A1 | 6/2012 | Bakker et al. | |
| 2012/0184290 A1 | 7/2012 | Kazmi et al. | |
| 2013/0121294 A1* | 5/2013 | Cheng | H04W 72/042 |
| 2013/0188510 A1 | 7/2013 | Siomina et al. | |
| 2013/0267246 A1* | 10/2013 | Wang et al. | H04W 24/00 |
| 2014/0094188 A1 | 4/2014 | Kazmi et al. | |
| 2014/0293818 A1 | 10/2014 | Sesia et al. | |
| 2014/0341192 A1 | 11/2014 | Venkob et al. | |
| 2015/0071101 A1 | 3/2015 | Mager et al. | |
| 2015/0323645 A1 | 11/2015 | Siomina et al. | |
| 2016/0143027 A1 | 5/2016 | Kim et al. | |
| 2016/0192339 A1 | 6/2016 | Axmon et al. | |
| 2016/0219453 A1* | 7/2016 | Harada et al. | H04W 24/10 |
| 2016/0262100 A1 | 9/2016 | Larsson et al. | |
| 2016/0337805 A1 | 11/2016 | Liao et al. | |
| 2016/0345195 A1 | 11/2016 | Axmon et al. | |
| 2017/0201973 A1 | 7/2017 | Yang et al. | |
| 2017/0230815 A1* | 8/2017 | Yasukawa et al. | H04W 8/005 |
| 2017/0339595 A1 | 11/2017 | Siomina et al. | |
| 2018/0034598 A1 | 2/2018 | Yiu et al. | |
| 2018/0084448 A1* | 3/2018 | Yang et al. | H04W 24/10 |
| 2018/0217228 A1 | 8/2018 | Edge et al. | |
| 2018/0227717 A1* | 8/2018 | Bhardwaj et al. | H04W 4/06 |
| 2018/0295547 A1 | 10/2018 | Tsuboi et al. | |
| 2018/0343635 A1* | 11/2018 | Edge et al. | H04W 64/00 |
| 2018/0367281 A1 | 12/2018 | Kim et al. | |
| 2019/0021017 A1 | 1/2019 | Nagaraja et al. | |
| 2019/0052996 A1* | 2/2019 | Sahai et al. | H04W 4/02 |
| 2019/0101615 A1 | 4/2019 | Tenny | |
| 2019/0124533 A1* | 4/2019 | Tenny et al. | H04W 24/10 |
| 2019/0166452 A1 | 5/2019 | Tenny | |
| 2019/0230619 A1 | 7/2019 | Cui et al. | |
| 2019/0239123 A1* | 8/2019 | Kim et al. | H04W 28/26 |
| 2019/0261308 A1 | 8/2019 | Razavi et al. | |
| 2020/0128453 A1 | 4/2020 | Teyeb et al. | |

OTHER PUBLICATIONS

3GPP, "Technical Specification Group Radio Access Network; NG Radio Access Network (NG-RAN); Stage 2 functional specification of User Equipment (UE) positioning in NG-RAN (Release 15)," 3GPP TS 38.305 V1.0.0 (Mar. 2018), 5G, 54 pages.

3GPP, "Technical Specification Group Radio Access Network NR Radio Resource Control (RRC) protocol specification (Release 15)," 3GPP TS 38.331 V15.0.0 (Dec. 2017), 5G, 188 pages.

3GPP, "Technical Specification Group Radio Access Network; NR; Requirements for support of radio resource management (Release 15)," 3GPP TS 38.133 V15.0.0 (Dec. 2017), 5G, 41 pages.

United States Patent Office—Office Action dated Oct. 17, 2019 from U.S. Appl. No. 16/372,139, 17 pages.

United States Patent Office—Final Office Action dated Feb. 28, 2020 from U.S. Appl. No. 16/372,139, 18 pages.

United States Patent Office—Office Action dated Feb. 3, 2020 from U.S. Continuation U.S. Appl. No. 16/407,542, 17 pages.

* cited by examiner

INTER-RADIO ACCESS TECHNOLOGY POSITIONING MEASUREMENTS IN NEW RADIO SYSTEMS

CROSS REFERENCE TO RELATED APPLICATION

The present application is a continuation of U.S. patent application Ser. No. 16/372,139, filed Apr. 1, 2019, and entitled "Inter-Radio Access Technology Positioning Measurements in New Radio Systems," which claims priority to U.S. Provisional Patent Application No. 62/651,500, filed Apr. 2, 2018, and entitled "Inter-Radio Access Technology (RAT) Observed Time Difference of Arrival (OTDOA) Measurement in New Radio (NR) Systems," which are hereby incorporated by reference in their entireties.

FIELD

Embodiments of the present invention relate generally to the technical field of wireless communications.

BACKGROUND

Observed Time Difference of Arrival (OTDOA) is a positioning method that makes use of measured timing of downlink signals received from multiple transmission points (TPs), comprising evolved NodeBs (eNBs), next generation eNBs (ng-eNBs) and Positioning Reference Signal (PRS)-only TPs, at the UE. A user equipment (UE) may measure the timing of the received signals using assistance data received from a positioning server, and resulting measurements may be used to locate the UE in relation to one or more neighboring TPs. A TP may be a set of geographically co-located transmit antennas for a cell, part of a cell or a PRS-only TP. TPs may include a base station (for example, an ng-eNB or gNB) antennas, remote radio heads, a remote antenna of a base station, an antenna of a PRS-only TP, and/or the like. Additionally, in some implementations a single TP may correspond with one cell, while in other implementations, one or more TPs may form one cell. A PRS-only TP may be a TP that only transmits PRS signals for PRS-based Terrestrial Beacon System (TB S) positioning for Evolved Universal Terrestrial Radio Access (E-UTRA) and is not associated with a cell.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Figure 1:
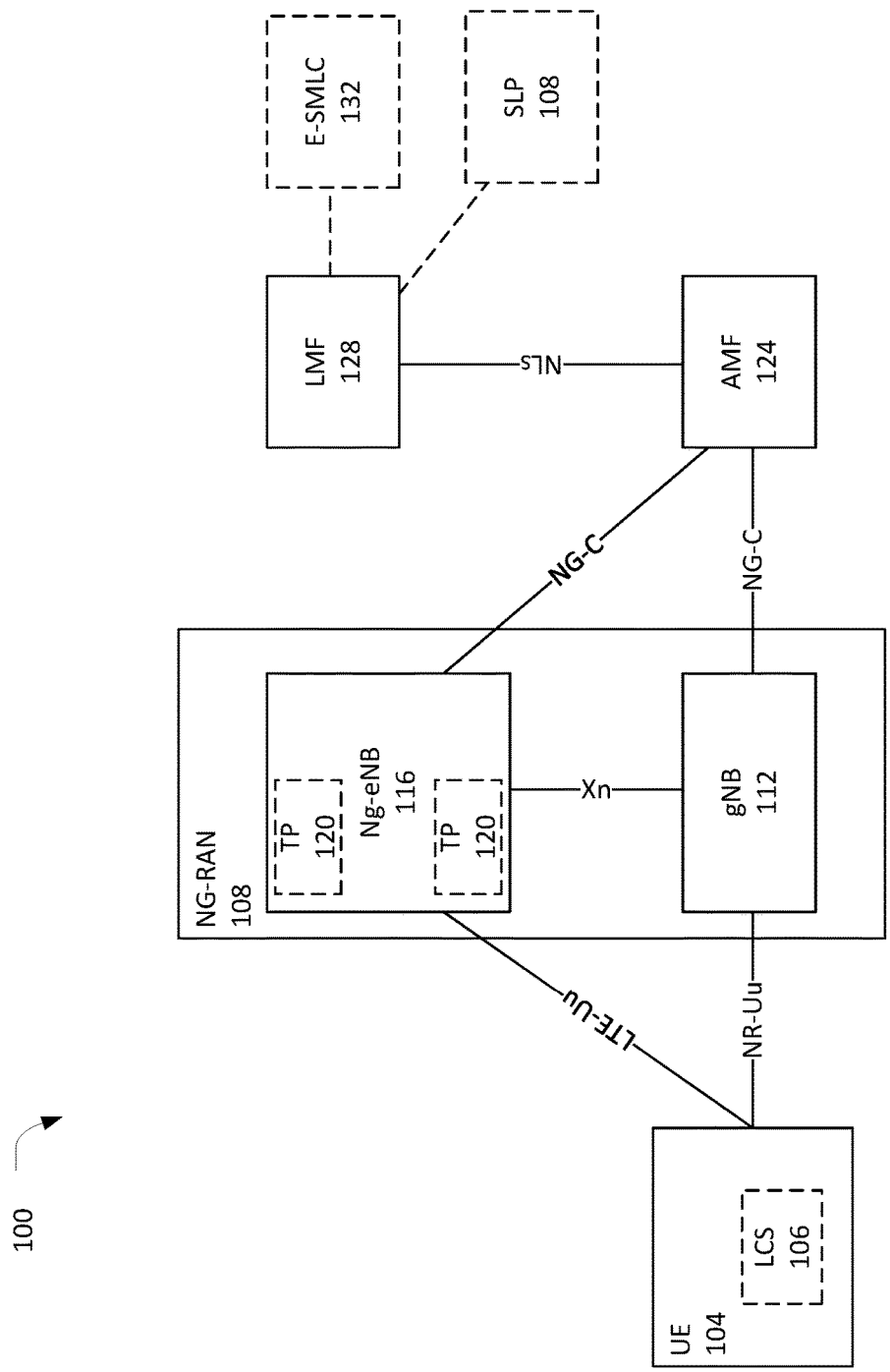
FIG. 1 illustrates a positioning architecture in accordance with some embodiments.

FIG. 1 illustrates a positioning architecture 100 for fifth generation system (5GS) applicable to positioning of a UE 104 with a next generation radio access network (NG-RAN) 108 in accordance with some embodiments. Except as otherwise described herein, the positioning architecture 100 and components described may be similar to the architecture and corresponding components described in Third Generation Partnership Project (3GPP) Technical Specification (TS) 38.305 v1.0.0 (2018 Mar. 12).

In some embodiments, the UE 104 may make measurements of downlink signals from the NG-RAN 108 or other sources such as evolved universal terrestrial radio access network (E-UTRAN), global navigation satellite system (GNSS), terrestrial beacon system (TBS), wireless local area network (WLAN) access points, Bluetooth beacons, UE barometric sensors, etc. the measurements to be made may be determined by a chosen or selected positioning method. The UE 104 may also contain location services (LCS) application 106 or access an LCS application either through communication with a network accessed by the UE 104 or through another application residing in the UE 104. The LCS application 106 may include or indicate the measurements and/or calculation functions to be used to determine the UE position (or geolocation) with or without network assistance.

The UE 104 may also include or implement one or more independent positioning functions and associated components (for example, GNSS/global positioning system (GPS) or the like), and the UE 104 may be able to report the UE position, independent of transmissions from the NG-RAN transmissions. In some embodiments, the UE 104 may report positioning information from these independent positioning functions/components, and this information may be used to assist the 5GS positioning determination. A UE 104 with an independent positioning functionality may also make use of assistance information obtained from the NG-RAN 108.

The NG-RAN 108 may include a next generation nodeB (gNB) 112 and a next generation evolved node B (ng-eNB) 116 coupled with one another by an Xn interface. The gNB 112 and ng-eNB 116 may be generically referred to as either base stations or access nodes.

The gNB 112 and ng-eNB may provide measurement information for the UE 104 and communicate the information to a location management function (LMF) 128.

The ng-eNB 116 may control several TPs 120, such as remote radio heads, PRS-only TPs for support of PRS-based TBS for E-UTRA, and/or the like. The ng-eNB 116 may further perform various measurements in response to requests from the LMF 128.

In addition, the UE 104 and access nodes may perform operations, procedures, processes, etc. of any of the previously described embodiments and/or any of the examples discussed infra, or portions thereof.

The NG-RAN 108 may be coupled with an access and mobility management function (AMF) 124 through respective NG-C interfaces between the AMF 124 and the ng-eNB 116 and the gNB 112.

The AMF 124 may receive a request for some location service associated with a particular target UE from another entity (for example, Gateway Mobile Location Center (GMLC)) or the AMF 124 itself may decide to initiate some location service on behalf of a particular target UE (for example, for an IMS emergency call from the UE 104). The AMF 124 may then send a LCS request to the LMF 128 over an NLs interface.

The LMF 128 may manage the support of different LCS for target UEs, including positioning of UEs and delivery of assistance data to UEs. The LMF 128 may interact with the access nodes that serve the UE 104 (for example, gNB 112 or ng-eNB 116) in order to obtain position measurements for the UE 104, including uplink measurements made by the ng-eNB 116 and downlink measurements made by the UE 104 that were provided to an ng-eNB 116 as part of other functions such as for support of handover. The LMF 128 may process the LCS request, which may include transferring assistance data to the UE 104 to assist with UE-based or UE-assisted positioning. Processing the LCS request may additionally/alternatively include positioning of the UE 104. The LMF 128 may then return the result of the location service back to the AMF 124 (for example, a position estimate for the UE 104 or an indication of any assistance data transferred to the UE 104). When the LCS is requested by an entity other than the AMF 124 (for example, a gateway mobile location center (GMLC)), the AMF 124 may return the LCS result to the requesting entity.

The LMF 128 may have a signaling connection to an Enhanced Serving Mobile Location Center (E-SMLC) 132, which may enable the LMF 128 to access information from an E-UTRAN (for example, to support the OTDOA for E-UTRA positioning method using downlink measurements obtained by the target UE of signals from eNBs and/or PRS-only TPs in E-UTRAN). The LMF 128 may also have a signaling connection to a secure user plane location (SUPL) Location Platform (SLP). The SLP is an SUPL entity responsible for positioning over the user plane.

The LMF 128 may also interact with any ng-eNB reachable from any of the AMFs with signaling access to the LMF 128 in order to obtain location-related information to support the OTDOA for E-UTRA positioning method, including PRS-based TBS for E-UTRA. The location-related information may include timing information for the TP in relation to either absolute GNSS time or timing of other TPs and information about the supported cells and TPs including PRS schedule.

The LMF 128 may interact with the UE 104 in order to deliver assistance data for a particular location service, if requested, or to obtain a location estimate if requested. For positioning of the UE 104, the LMF 128 may decide or select the position methods to be used. The decision/selection may be based on factors that may include an LCS Client type, required Quality of Service (QoS), UE positioning capabilities, gNB positioning capabilities, ng-eNB positioning capabilities, and/or other like factors. The LMF 128 may then invoke the determined/selected positioning methods in or at the UE 104, the gNB 112, or the ng-eNB 116. The positioning methods may yield a location estimate for the UE-based position methods or positioning measurements for UE-assisted and network-based position methods. The LMF 128 may combine all the received results and determine a single location estimate for the UE 104 (for example, hybrid positioning). Additional information such as accuracy of the location estimate and velocity may also be determined by the LMF 128 or at the UE 104, the gNB 112, or the ng-eNB 116.

In previous positioning methods, OTDOA is only available on E-UTRAN eNBs; and, for NR standalone (SA) operation, a UE could only be configured to measure inter-radio access technology (RAT) E-UTRAN reference signal time difference (RSTD) for OTDOA positioning. In such methods, an UE would receive a request from an LMF, and conduct an RSTD measurement on inter-RAT E-UTRAN cell. However, the LTE positioning protocol (LPP) signaling could not be decoded by the serving gNB, so the gNB would not configure any measurement gap for the UE OTDOA measurement.

Embodiments herein provide mechanisms for requesting measurement gap(s) for positioning measurements, for example, inter-RAT OTDOA measurements. For example, some embodiments describe the UE 104 requesting a measurement gap from serving access node for an inter-RAT RSTD measurement for OTDOA positioning purpose.

Figure 2:
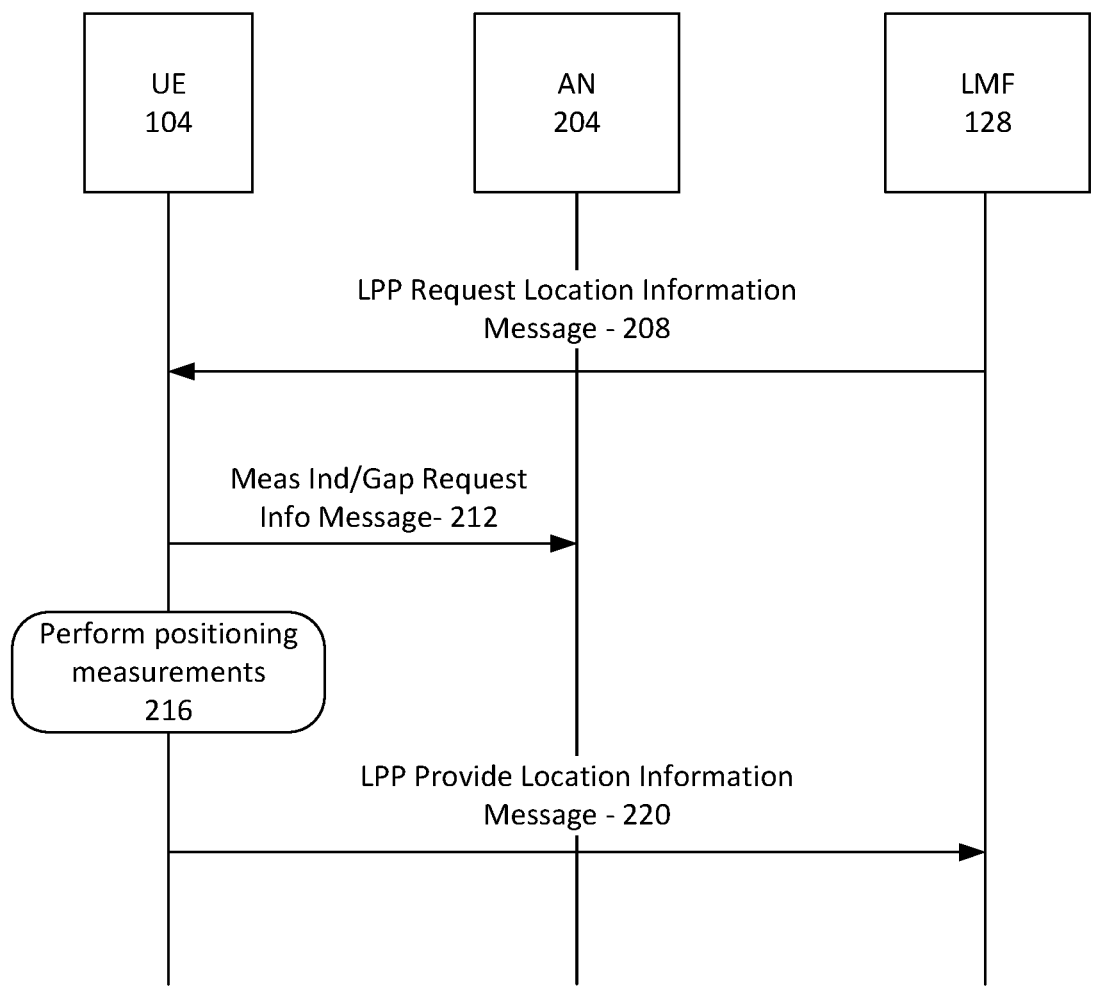
FIG. 2 illustrates messaging between components of a positioning architecture in accordance with some embodiments.

FIG. 2 illustrates messaging between components of the positioning architecture 100 in accordance with some embodiments. In particular, FIG. 2 illustrates messaging between the UE 104, an access node 204, and the LMF 128. The access node 204 may include one or more components of the NG-RAN 108 including, for example, gNB 112, ng-eNB 116, or TP 120.

The LMF 128 may send an LPP request location information message 208 (hereinafter "request 208") to the UE 104. The request 208 may include an indication of OTDOA measurements that are requested and, may further include measurement configuration information to facilitate the measurements. In some embodiments, the request 208 may further include a required response time in which the measurements are to be performed.

The UE 104 may then send a measurement indication or gap request information message 212 (hereinafter "information message 212") to the access node 204. The information message 212 may include information that will allow the access node 204 to facilitate the measurements that are to be performed by the UE 104.

In some embodiments, the information message 212 may be an inter-RAT RSTD/OTDOA Measurement Indication or an inter-frequency RSTD/OTDOA Measurement Indication sent to the serving gNB (for example, AN 204). As used herein, inter-RAT RSTD/OTDOA measurement may mean a positioning measurement that is to be performed on signals received from a node of a different RAT/frequency than the AN 204 (e.g., different RAT and different carrier frequency); and an inter-frequency RSTD/OTDOA measurement may mean a positioning measurement that is to be performed on signals from the same RAT (e.g., an NG-RAN), but on a carrier frequency different than that used by the AN 204 to serve the UE 104.

An inter-RAT or an inter-frequency RSTD/OTDOA measurement indication may include indications related to measurement gaps or positioning reference signals (PRSs). For example, in some embodiments, the indications may include indications of: a measurement gap repetition periodicity (MGRP); a measurement gap length (MGL); a measurement gap offset; a measurement gap pattern identifier/identity (ID) (for example, pattern ID between 0~23); or a measurement gap type (for example, per-UE gap, or per-frequency range (FR) gap).

In some embodiments, the indications within the inter-RAT or an inter-frequency RSTD/OTDOA measurement indication may include OTDOA positioning assistance data. The OTDOA positioning assistance data may include, for example, indications of: a positioning reference signal (PRS) periodicity (for example, a PRS configuration index); a PRS time offset (based on, for example, a PRS configuration index); a PRS time duration (based on, for example, a PRS subframe number); or a PRS carrier frequency on which the UE 104 is to perform the positioning measurements.

In some embodiments, the information message 212 may be a measurement gap request sent to the serving gNB (for example, AN 204). Similar to the inter-RAT or inter-frequency RSTD/OTDOA measurement indications, unless as otherwise noted, the measurement gap request may include indications related to measurement gaps or PRSs.

For example, the measurement gap request may include indications of: an MGRP; an MGL; a measurement gap offset, a purpose of the requested measurement gap (for example, for positioning measurement); a measurement gap priority (for example, to indicate a priority of the requested measurement gap); a measurement gap pattern ID (for example, pattern ID between 0~23); or a measurement gap type (for example, per-UE gap, or per-frequency range (FR) gap).

For another example, the measurement gap may include OTDOA positioning assistance data having indications of, for example: PRS periodicity (based on, for example, a PRS configuration index), a PRS time offset (based on, for example, a PRS configuration index), a PRS time duration (based on, for example, a PRS subframe number), or a PRS carrier frequency on which the UE 104 is to perform the positioning measurements.

In some embodiments, the AN 204 may operate an NR SA cell. For such an NR SA case, the UE 104 may provide, by transmission of the information message 212, for example, inter-RAT OTDOA/RSTD information (for example, carrier frequency and PRS-offset/gap-offset) to the AN 204 for a measurement gap. With respect to measurement gap patterns, since there may be 24 gap patterns, each having different MGRP and MGL, the AN 204 may assume that only one gap pattern (for example, gap pattern #0 having MGRP=40 ms and MGL=6 ms) may be used for inter-RAT RSTD measurement.

In some NR SA embodiments, when inter-RAT RSTD measurements are configured and the UE 104 desires measurement gaps for performing such measurements, only gap pattern #0 may be used. In some embodiments, the serving gNB may only configure gap pattern #0 (for example, MGRP=40 ms, MGL=6 ms) for UE inter-RAT OTDOA/RSTD measurement in NR SA case, while in other embodiments, the serving gNB (for example, AN 204) may configure any other gap pattern (for example, from 0~23) for UE inter-RAT OTDOA/RSTD measurement in NR SA case based on an indication received from the UE in the information message.

In some NR embodiments, the positioning (for example, OTDOA/RSTD) measurements may have higher priority than other UE measurement activities. Thus, the AN 204 may reserve measurement gap resource for positioning (for example, OTDOA/RSTD) measurements without any sharing with other UE measurement activities. Said another way, the AN 204 may prioritize reservation of resources for the measurement gap for the positioning measurements over other UE activities.

At 216, the UE 104 may perform the positioning measurements. The positioning measurements may be performed by the UE 104 based on signals, for example, PRSs, transmitted by access nodes in other frequencies or RATs. The positioning measurements may be performed within the measurement gaps configured by the AN 204 and may otherwise be similar to the above discussion with respect to FIG. 1.

The UE 104 may then encode and send an LPP provide location information message 220 (hereinafter also referred to as "provide information message 220") the LMF 128. The provide information message 220 may include any positioning measurements obtained by the UE 104, for example, at 216.

In some embodiments, the UE 104 may send the provide information message 220 to the LMF 128 before the response time, provided in the request information message 208, expires. In some embodiments, the UE 104 may have a timer that is set with the response time, upon receipt, in order to monitor this response time period. If the UE 104 is unable to perform the requested measurements, or the response time has elapsed before any of the requested measurements were obtained, the UE 104 may return any information that can be provided in the provide information message 220 and may further include a cause indication for information requested but not provided.

Figure 3:
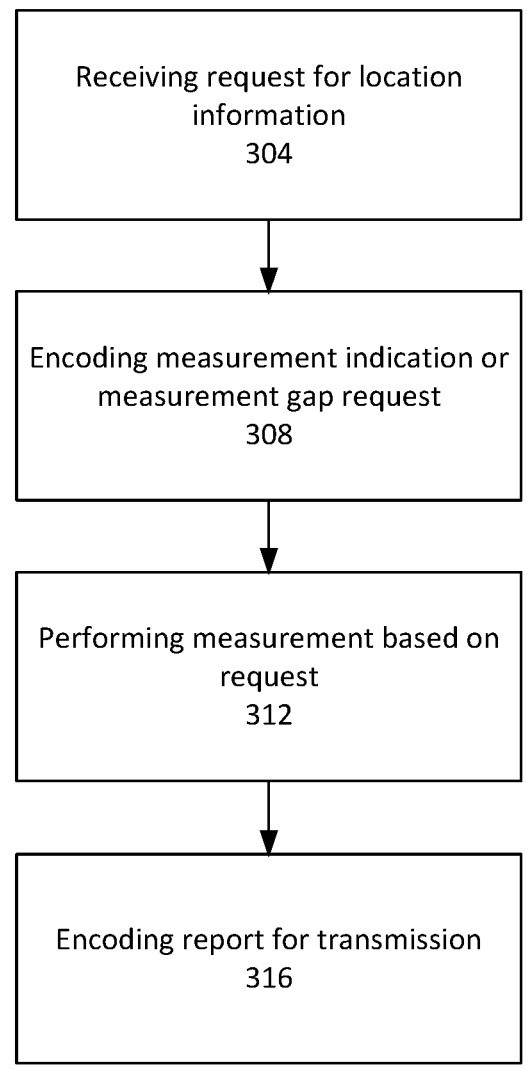
FIG. 3 illustrates an operation flow/algorithmic structure in accordance with some embodiments.

FIG. 3 illustrates an operation flow/algorithmic structure 300 in accordance with some embodiments. The operation flow/algorithmic structure 300 may be performed or implemented by a UE (for example, UE 104) or components thereof (for example, baseband or application circuitry) as described herein.

The operation flow/algorithmic structure 300 may include, at 304, receiving a request for location information. In some embodiments, the request may be an LPP request location information message from the LMF 128 as described above with respect to FIG. 2. Receipt of the request for location information may include a number of receive operations including, not limited to, decoding, demapping, demodulating, processing, etc. these operations may be performed by one or more components of the UE 104 to obtain the information transmitted in the request.

In some embodiments, while the request is received from a serving access node, the contents included therein may be transparent, or not otherwise available, to the serving access node. In some embodiments, the request may be received from the gNB over an NR-Uu interface.

The operation flow/algorithmic structure 300 may further include, at 308, encoding a measurement indication or measurement gap request. The measurement indication or measurement gap request may be encoded to include information that is to be transmitted to the serving access node to facilitate positioning measurements that are to be performed by the UE 104. In some embodiments, the measurement indication or measurement gap request may be similar to the information message 212 described above with respect to FIG. 2.

In some embodiments, a first component of the UE 104 (for example, application circuitry) may determine the information that is to be transmitted to the serving access node, while a second component of the UE 104 (for example, baseband circuitry) may encode the information into the measurement indication or measurement gap request. Furthermore, a third component of the UE 104 (for example, radio-frequency circuitry) may cause the encoded measurement indication or measurement gap request to be transmitted to the serving access node over the air (for example, the gNB 112 over the NR-Uu interface).

The information included in the measurement indication or measurement gap request may be similar to that described above with respect to FIG. 2.

The operation flow/algorithmic structure 300 may further include, at 312, performing measurements based on the request. The measurements, which may be OTDOA/RSTD measurements, may be performed on one or more inter-RAT or inter-frequency signals (for example, PRSs). The performance may be similar to that described above with respect to FIG. 1 and may be performed within a measurement gap configured by the serving access node.

The operation flow/algorithmic structure 300 may further include, at 316, encoding a report for transmission. The report may include the results of the positioning measurements requested at 304. In some embodiments, the report may be similar to, for example, the LPP provide location information message 220 described above with respect to FIG. 2.

The report may be encoded for transmission (by one or more other components of the UE 104) to the requesting LMF (for example, LMF 128). In some embodiments, the report may be transmitted to the serving access node (for example, AN 204) over the LTE-Uu interface or the NR-Uu interface. The serving access node may then forward the report to the LMF 128 over an NG-C interface.

Figure 4:
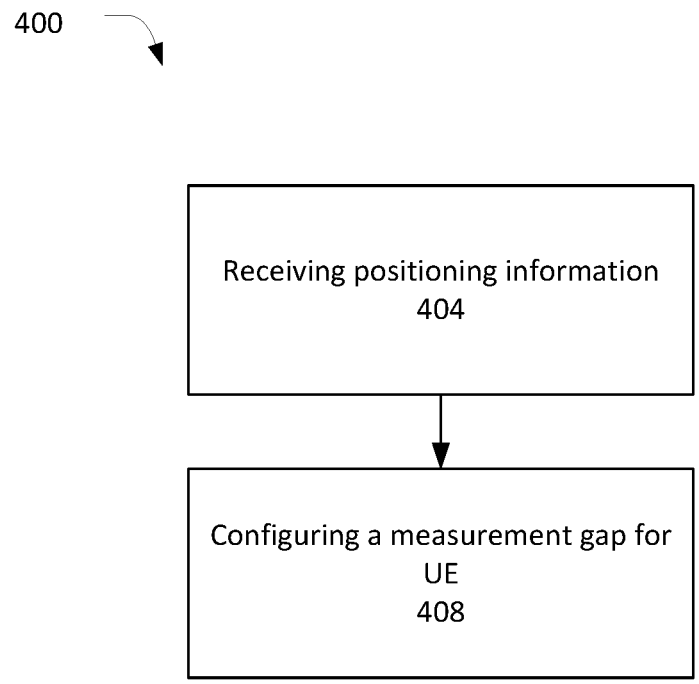
FIG. 4 illustrates another operation flow/algorithmic structure in accordance with some embodiments.

FIG. 4 illustrates an operation flow/algorithmic structure 400 in accordance with some embodiments. The operation flow/algorithmic structure 400 may be performed or implemented by an access node (for example, AN 204) or components thereof (for example, baseband or application circuitry of gNB 112) as described herein.

The operation flow/algorithmic structure 400 may include, at 404, receiving positioning information. The positioning information may be received in a message such as, for example, the measurement indication or gap request information message 212 described above with respect to FIG. 2.

Receiving the positioning information may include a variety of operations performed by one or more components of the AN 204. These operations may include, for example, decoding, de-mapping, demodulating, etc.

The positioning information may be information related to a measurement gap or positioning reference signals, similar to that described above with respect to FIG. 2.

The operation flow/algorithmic structure 400 may include, at 408, configuring a measurement gap for the UE 104 to perform positioning measurements. In some embodiments, the configuring of the measurement gap may include the AN 204 scheduling communications within one or more cells controlled by the AN 204 in manner to eliminate or otherwise reduce signals that have the potential of interfering with the positioning measurements.

In some embodiments, the configuration at 408 may include generation and transmission of one or more configuration messages to UEs, neighbor access nodes, etc.

In some embodiments, the AN 204 may prioritize reservation of resources for the measurement gap, configured at 408, over other activities performed by the UE 104.

Figure 5:
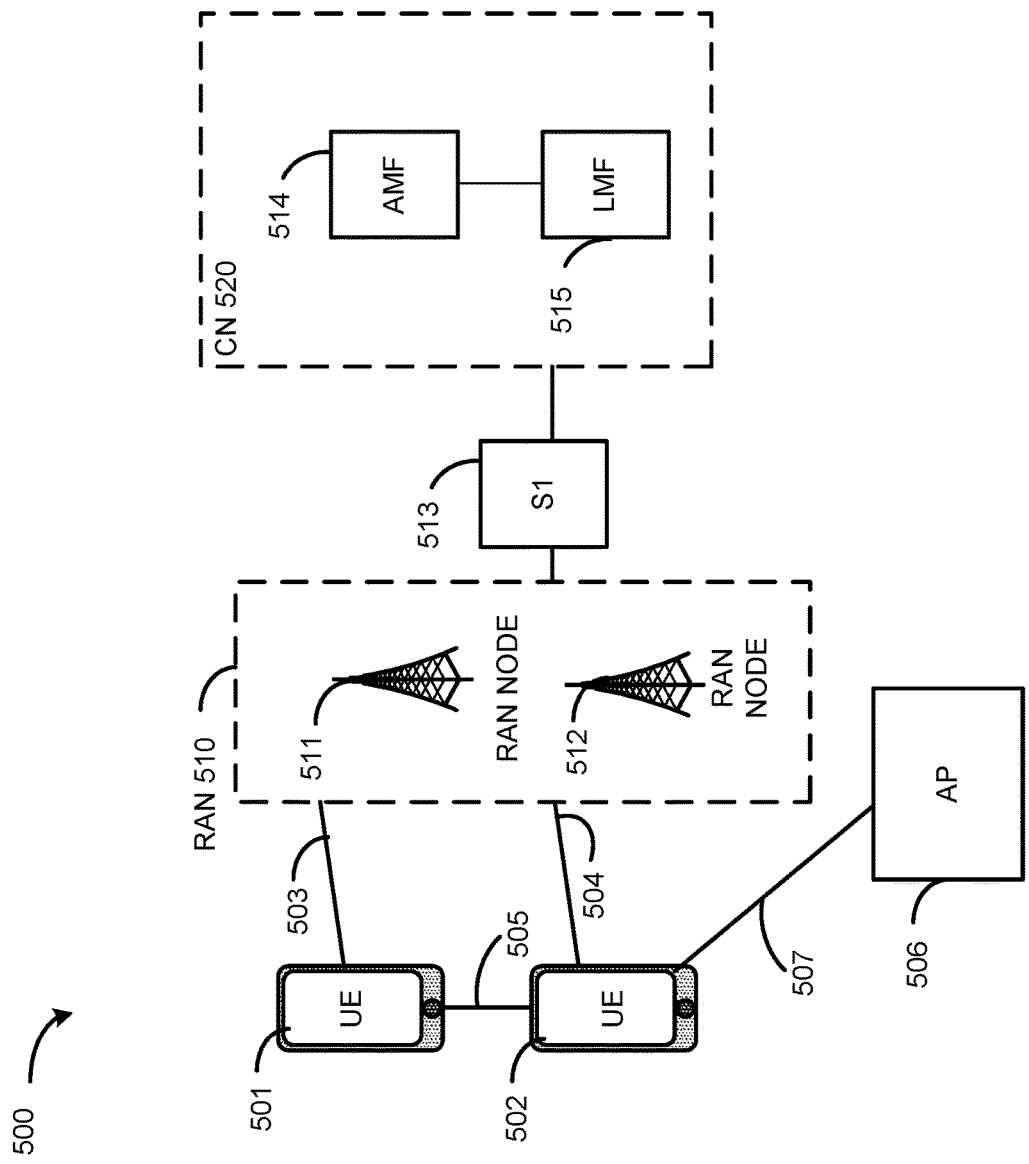
FIG. 5 illustrates an architecture of a system of a network in accordance with some embodiments.

FIG. 5 illustrates an architecture of a system 500 of a network in accordance with some embodiments. In general, components of the system 500 may be similar to and substantially interchangeable with like-named components of FIG. 1.

The system 500 is shown to include a UE 501 and a UE 502, either or both of which may correspond to UE 104. As used herein, the term "user equipment" or "UE" may refer to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In this example, UEs 501 and 502 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or the like.

In some embodiments, any of the UEs 501 and 502 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 501 and 502 may be configured to connect, e.g., communicatively couple, with a radio access network (RAN) 510. The RAN 510 may be, for example, an Evolved Universal Mobile Telecommunications System (UMTS) Terrestrial Radio Access Network (E-UTRAN), a NextGen RAN (NG RAN), or some other type of RAN. The UEs 501 and 502 utilize connections (or channels) 503 and 504, respectively, each of which comprises a physical communications interface or layer (discussed in further detail infra). As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information. In this example, the connections 503 and 504 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 501 and 502 may further directly exchange communication data via a ProSe interface 505. The ProSe interface 505 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH). In various implementations, the SL interface 505 may be used in vehicular applications and communications technologies, which are often referred to as V2X systems. V2X is a mode of communication where UEs (for example, UEs 501, 502) communicate with each other directly over the PC5/SL interface 505 and can take place when the UEs 501, 502 are served by RAN nodes 511, 512 or when one or more UEs are outside a coverage area of the RAN 510. V2X may be classified into four different types: vehicle-to-vehicle (V2V), vehicle to-infrastructure (V2I), vehicle-to-network (V2N), and vehicle-to-pedestrian (V2P). These V2X applications can use "co-operative awareness" to provide more intelligent services for end-users. For example, vehicle UEs (vUEs) 501, 502, RAN nodes 511, 512, application servers 530, and pedestrian UEs 501, 502 may collect knowledge of their local environment (for example, information received from other vehicles or sensor equipment in proximity) to process and share that knowledge in order to provide more intelligent services, such as cooperative collision warning, autonomous driving, and the like. In these implementations, the UEs 501, 502 may be implemented/employed as Vehicle Embedded Communications Systems (VECS) or vUEs.

The UE 502 is shown to be configured to access an access point (AP) 506 (also referred to as "WLAN node 506", "WLAN 506", "WLAN Termination 506" or "WT 506" or the like) via connection 507. The connection 507 can comprise a local wireless connection, such as a connection consistent with any IEEE 802.11 protocol, wherein the AP 506 would comprise a wireless fidelity (WiFi®) router. In this example, the AP 506 is shown to be connected to the Internet without connecting to the core network of the wireless system (described in further detail below). In various embodiments, the UE 502, RAN 510, and AP 506 may be configured to utilize LTE-WLAN aggregation (LWA) operation and/or WLAN LTE/WLAN Radio Level Integration with IPsec Tunnel (LWIP) operation. The LWA operation may involve the UE 502 in RRC_CONNECTED being configured by a RAN node 511, 512 to utilize radio resources of LTE and WLAN. LWIP operation may involve the UE 502 using WLAN radio resources (e.g., connection 507) via Internet Protocol Security (IPsec) protocol tunneling to authenticate and encrypt packets (e.g., interne protocol (IP) packets) sent over the connection 507. IPsec tunneling may include encapsulating entirety of original IP packets and adding a new packet header, thereby protecting the original header of the IP packets.

The RAN 510 can include one or more access nodes 511 and 512 that enable the connections 503 and 504. The access nodes 511 and 512 may correspond to and be substantially interchangeable with AN 204.

As used herein, the terms "access node," "access point," or the like may describe equipment that provides the radio baseband functions for data and/or voice connectivity between a network and one or more users. These access nodes can be referred to as base stations (BS), NodeBs, evolved NodeBs (eNBs), gNBs, ng-eNBs, RAN nodes, Road Side Units (RSUs), and so forth, and can comprise ground stations (e.g., terrestrial access points) or satellite stations providing coverage within a geographic area (e.g., a cell). The term "Road Side Unit" or "RSU" may refer to any transportation infrastructure entity implemented in or by a gNB/eNB/RAN node or a stationary (or relatively stationary) UE, where an RSU implemented in or by a UE may be referred to as a "UE-type RSU", an RSU implemented in or by an eNB may be referred to as an "eNB-type RSU."

Any of the RAN nodes 511 and 512 can terminate the air interface protocol and can be the first point of contact for the UEs 501 and 502. In some embodiments, any of the RAN nodes 511 and 512 can fulfill various logical functions for the RAN 510 including, but not limited to, radio network controller (RNC) functions such as radio bearer management, uplink and downlink dynamic radio resource management and data packet scheduling, and mobility management.

In accordance with some embodiments, the UEs 501 and 502 can be configured to communicate using Orthogonal Frequency-Division Multiplexing (OFDM) communication signals with each other or with any of the RAN nodes 511 and 512 over a multicarrier communication channel in accordance with various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 511 and 512 to the UEs 501 and 502, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 501 and 502. The physical downlink control channel (PDCCH) may carry information about the transport format and resource allocations related to the PDSCH channel, among other things. It may also inform the UEs 501 and 502 about the transport format, resource allocation, and H-ARQ (Hybrid Automatic Repeat Request) information related to the uplink shared channel. Typically, downlink scheduling (assigning control and shared channel resource blocks to the UE 502 within a cell) may be performed at any of the RAN nodes 511 and 512 based on channel quality information fed back from any of the UEs 501 and 502. The downlink resource assignment information may be sent on the PDCCH used for (e.g., assigned to) each of the UEs 501 and 502.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs in some situations.

The RAN 510 is shown to be communicatively coupled to a core network (CN) 520 via an S1 interface 513. In embodiments, the CN 520 may be an evolved packet core (EPC) network, a NextGen Packet Core (NPC) network, or some other type of CN.

The core network 520 may include an AMF 514 and an LMF 515, which may be similar to AMF 124 and LMF 128 described above.

Furthermore, the AMF 514 may be responsible for registration management (e.g., for registering UEs, etc.), connection management, reachability management, mobility management, and lawful interception of AMF-related events, and access authentication and authorization. Furthermore, AMF 514 may be a termination point of RAN CP interface, which may include or be an N2 reference point between the (R)AN XR11 and the AMF 514; and the AMF 514 may be a termination point of NAS (N1) signalling, and perform NAS ciphering and integrity protection.

AMF 514 may also support NAS signalling with a UE (501 or 502) over an N3 interworking-function (IWF) interface. The N3IWF may be used to provide access to untrusted entities.

Figure 6:
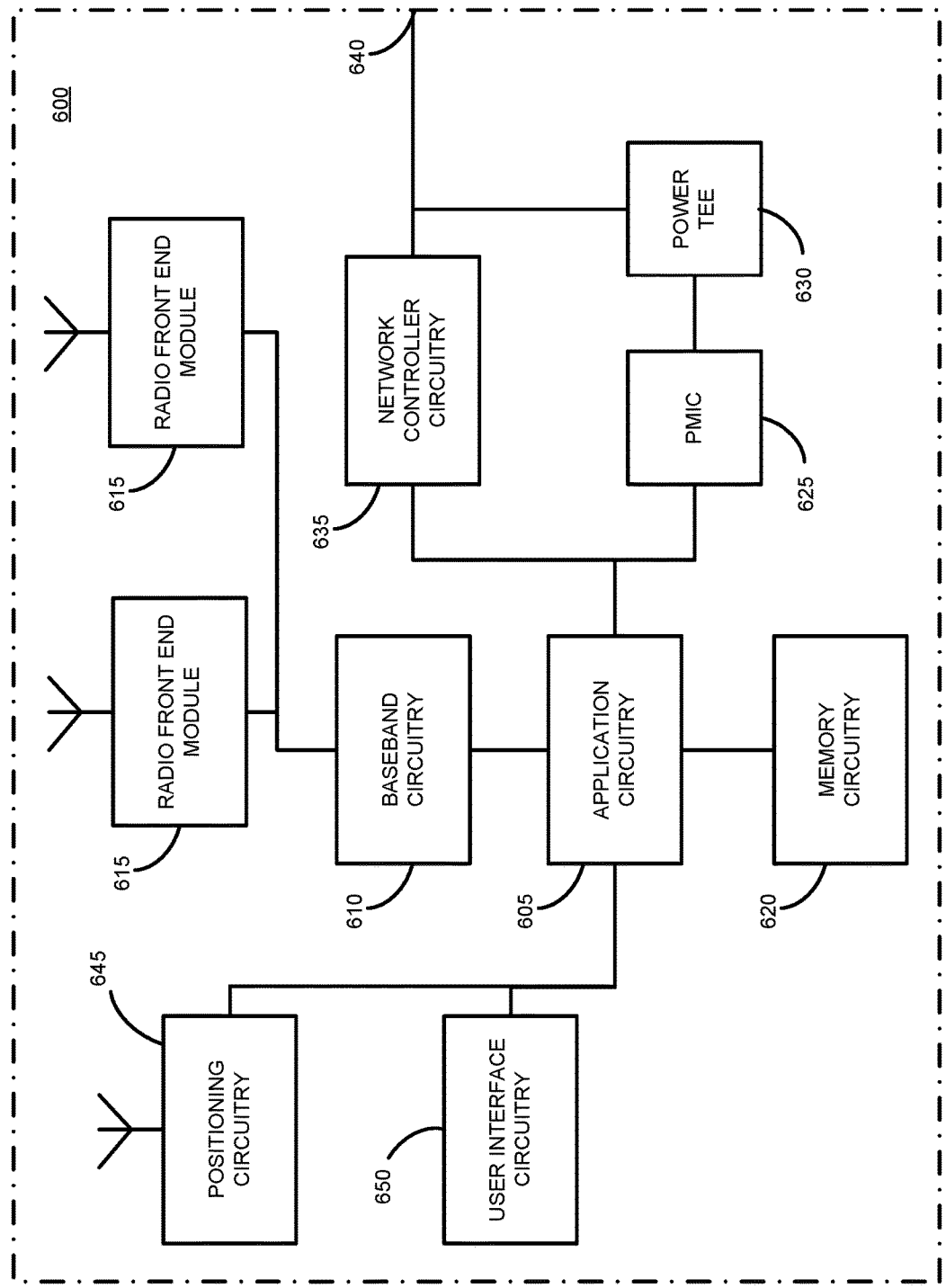
FIG. 6 illustrates an example of an infrastructure equipment in accordance with various embodiments.

FIG. 6 illustrates an example of infrastructure equipment 600 in accordance with various embodiments. The infrastructure equipment 600 (or "system 600") may be implemented as a base station, radio head, RAN node, etc., such as the RAN nodes 511 and 512, and/or AP 506 shown and described previously. In other examples, the system 600 could be implemented in or by a UE and/or any other element/device discussed herein.

The system 600 may include one or more of application circuitry 605, baseband circuitry 610, one or more radio front end modules 610, memory 620, power management integrated circuitry (PMIC) 625, power tee circuitry 630, network controller 635, network interface connector 640, satellite positioning circuitry 645, and user interface 650. In some embodiments, the device 600 may include additional elements such as, for example, memory/storage, display, camera, sensor, or input/output (I/O) interface. In other embodiments, the components described below may be included in more than one device (for example, said circuitries may be separately included in more than one device for Cloud-RAN (C-RAN) implementations).

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The terms "application circuitry" and/or "baseband circuitry" may be considered synonymous to, and may be referred to as "processor circuitry." As used herein, the term "processor circuitry" may refer to, is part of, or includes circuitry capable of sequentially and automatically carrying out a sequence of arithmetic or logical operations; and recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Application circuitry 605 may include circuitry to implement applications such as, but not limited to, LCS application 106. In some embodiments, the circuitry may include one or more central processing unit (CPU) cores and one or more of cache memory, low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD/)MultiMediaCard (MMC) or similar, Universal Serial Bus (USB) interfaces, Mobile Industry Processor Interface (MIPI) interfaces and Joint Test Access Group (JTAG) test access ports. As examples, the application circuitry 605 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the system 600 may not utilize application circuitry 605, and instead may include a special-purpose processor/controller to process IP data received from an EPC or 5GC, for example.

Additionally or alternatively, application circuitry 605 may include circuitry such as, but not limited to, one or more field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 605 may comprise logic blocks or logic fabric including other interconnected resources that may be programmed to perform various functions, such as the procedures, methods, functions, etc. of the various embodiments discussed herein. In such embodiments, the circuitry of application circuitry 605 may include memory cells (for example, erasable programmable read-only memory (EPROM), electrically erasable programmable read-only memory (EEPROM), flash memory, static memory (for example, static random access memory (SRAM), anti-fuses, etc.)) used to store logic blocks, logic fabric, data, etc. in lookup-tables (LUTs) and the like.

The baseband circuitry 610 may be implemented, for example, as a solder-down substrate including one or more integrated circuits, a single packaged integrated circuit soldered to a main circuit board or a multi-chip module containing two or more integrated circuits. Although not shown, baseband circuitry 610 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 610 may include protocol processing circuitry with one or more instances of control circuitry (not shown) to provide control functions for the digital baseband circuitry and/or radio frequency circuitry (for example, the radio front end modules 610).

User interface circuitry 650 may include one or more user interfaces designed to enable user interaction with the system 600 or peripheral component interfaces designed to enable peripheral component interaction with the system 600. User interfaces may include, but are not limited to, one or more physical or virtual buttons (for example, a reset button), one or more indicators (for example, light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a non-volatile memory port, a universal serial bus (USB) port, an audio jack, a power supply interface, etc.

The radio front end modules (RFEMs) 610 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 610. The RFEMs 610 may incorporate both millimeter wave antennas and sub-millimeter wave antennas.

The memory circuitry 620 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 620 may be implemented as one or more of solder down packaged integrated circuits, socketed memory modules and plug-in memory cards.

The PMIC 625 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 630 may provide for electrical power drawn from a network cable to provide both power supply and data connectivity to the infrastructure equipment 600 using a single cable.

The network controller circuitry 635 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 600 via network interface connector 640 using a physical connection, which may be electrical (commonly referred to as a "copper interconnect"), optical, or wireless. The network controller circuitry 635 may include one or more dedicated processors and/or FPGAs to communicate using one or more of the aforementioned protocol. In some implementations, the network controller circuitry 635 may include multiple controllers to provide connectivity to other networks using the same or different protocols.

The positioning circuitry 645 may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (for example, Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 645 may comprise various hardware elements (for example, including hardware devices such as switches, filters, amplifiers, antenna elements, and the like to facilitate the communications over-the-air (OTA) communications) to communicate with components of a positioning network, such as navigation satellite constellation nodes. The positioning circuitry 645 may perform the positioning measurements described herein, for example, with respect to FIG. 2.

Nodes or satellites of the navigation satellite constellation(s) ("GNSS nodes") may provide positioning services by continuously transmitting or broadcasting GNSS signals along a line of sight, which may be used by GNSS receivers (for example, positioning circuitry 645 and/or positioning circuitry implemented by UEs 701, 702, or the like) to determine their GNSS position. The GNSS signals may include a pseudorandom code (for example, a sequence of ones and zeros) that is known to the GNSS receiver and a message that includes a time of transmission (ToT) of a code epoch (for example, a defined point in the pseudorandom code sequence) and the GNSS node position at the ToT. The GNSS receivers may monitor/measure the GNSS signals transmitted/broadcasted by a plurality of GNSS nodes (for example, four or more satellites) and solve various equations to determine a corresponding GNSS position (for example, a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (for example, an offset of the GNSS receiver clock relative to the GNSS node time). In some embodiments, the positioning circuitry 645 may include a Micro-Technology for Positioning, Navigation, and Timing (Micro-PNT) IC that uses a master timing clock to perform position tracking/estimation without GNSS assistance.

The GNSS receivers may measure the time of arrivals (ToAs) of the GNSS signals from the plurality of GNSS nodes according to its own clock. The GNSS receivers may determine time of flight (ToF) values for each received GNSS signal from the ToAs and the ToTs, and then may determine, from the ToFs, a three-dimensional (3D) position and clock deviation. The 3D position may then be converted into a latitude, longitude and altitude. The positioning circuitry 645 may provide data to application circuitry 605, which may include one or more of position data or time data. Application circuitry 605 may use the time data to synchronize operations with other radio base stations (for example, RAN nodes 511, 512, or the like).

The components shown by FIG. 6 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an I²C interface, an SPI interface, point to point interfaces, and a power bus, among others.

Figure 7:
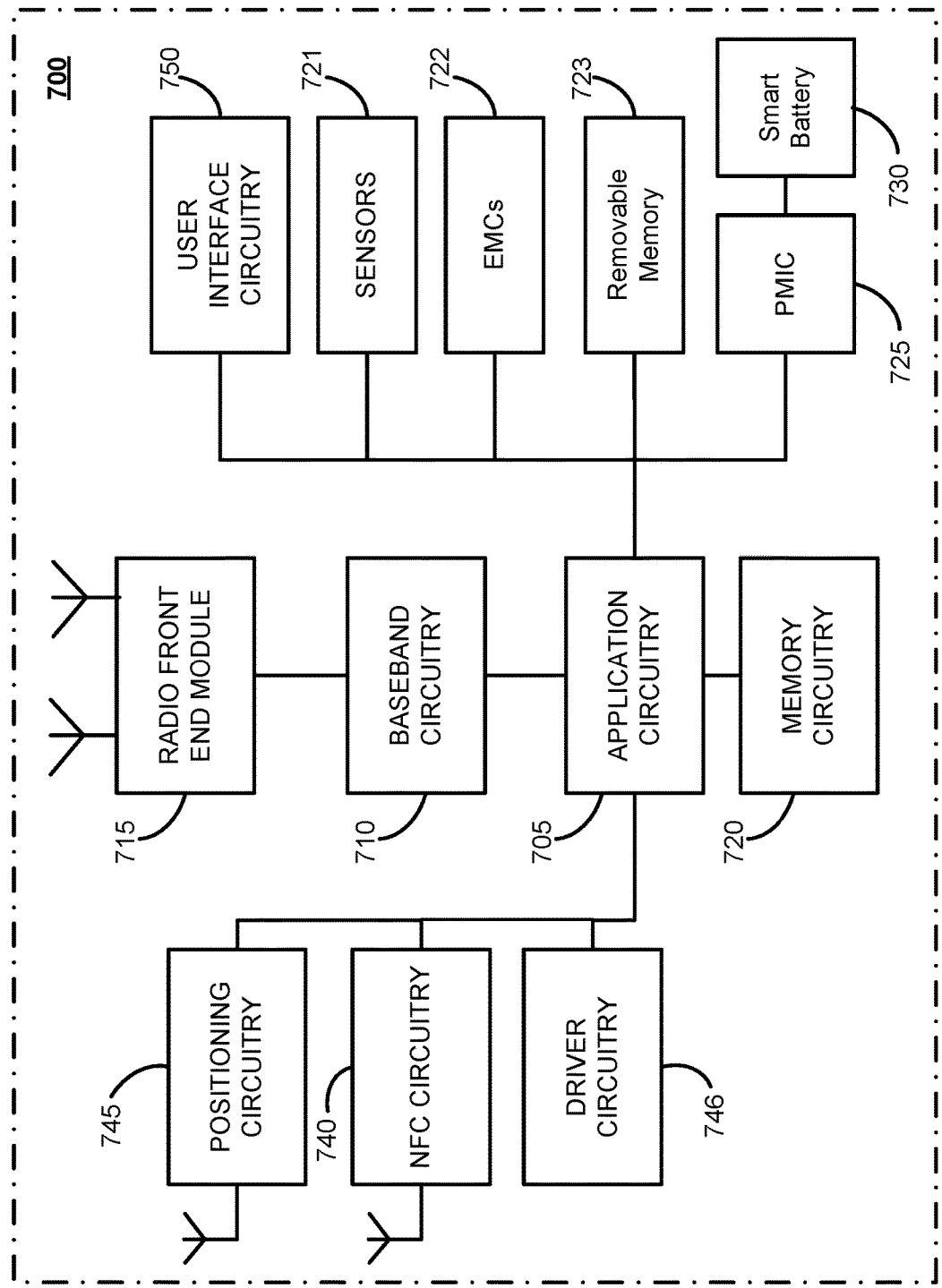
FIG. 7 illustrates an example platform in accordance with various embodiments.

FIG. 7 illustrates an example of a platform 700 (or "device 700") in accordance with various embodiments. In embodiments, the computer platform 700 may be suitable for use as UEs 104, 501, 502 and/or any other element/device discussed herein. The platform 700 may include any combinations of the components shown in the example. The components of platform 700 may be implemented as integrated circuits (ICs), portions thereof, discrete electronic devices, or other modules, logic, hardware, software, firmware, or a combination thereof adapted in the computer platform 700, or as components otherwise incorporated within a chassis of a larger system. The block diagram of FIG. 7 is intended to show a high level view of components of the computer platform 700. However, some of the components shown may be omitted, additional components may be present, and different arrangement of the components shown may occur in other implementations.

The application circuitry 705 may include circuitry such as, but not limited to single-core or multi-core processors and one or more of cache memory, low drop-out voltage regulators (LDOs), interrupt controllers, serial interfaces such as serial peripheral interface (SPI), inter-integrated circuit (I2C) or universal programmable serial interface circuit, real time clock (RTC), timer-counters including interval and watchdog timers, general purpose input-output (IO), memory card controllers such as secure digital/multimedia card (SD/MMC) or similar, universal serial bus (USB) interfaces, mobile industry processor interface (MIPI) interfaces and Joint Test Access Group (JTAG) test access ports. The processor(s) may include any combination of general-purpose processors and/or dedicated processors (e.g., graphics processors, application processors, etc.). The processors (or cores) may be coupled with or may include memory/storage and may be configured to execute instructions stored in the memory/storage to enable various applications or operating systems to run on the platform 700. In some embodiments, processors of application circuitry 605/705 may process IP data packets received from an EPC or 5GC.

Application circuitry 705 may have circuitry to implement applications such as, but not limited to, LCS application 106 described herein. The circuitry may include a microprocessor, a multi-core processor, a multithreaded processor, an ultra-low voltage processor, an embedded processor, or other known processing element. In one example, the application circuitry 705 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 705 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc.; an ARM-based design licensed from ARM Holdings, Ltd.; or the like. In some implementations, the application circuitry 705 may be a part of a system on a chip (SoC) in which the application circuitry 705 and other components are formed into a single integrated circuit, or a single package, such as the Edison™ or Galileo™ SoC boards from Intel® Corporation.

Additionally or alternatively, application circuitry 705 may include circuitry such as, but not limited to, one or more field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 705 may comprise logic blocks or logic fabric including other interconnected resources that may be programmed to perform various functions, such as the procedures, methods, functions, etc. of the various embodiments discussed herein. In such embodiments, the circuitry of application circuitry XT05 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in lookup-tables (LUTs) and the like.

The baseband circuitry 710 may be implemented, for example, as a solder-down substrate including one or more integrated circuits, a single packaged integrated circuit soldered to a main circuit board or a multi-chip module containing two or more integrated circuits. Although not shown, baseband circuitry 710 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 710 may include protocol processing circuitry with one or more instances of control circuitry (not shown) to provide control functions for the digital baseband circuitry and/or radio frequency circuitry (for example, the radio front end modules 715).

The radio front end modules (RFEMs) 715 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 715. The RFEMs 715 may incorporate both millimeter wave antennas and sub-millimeter wave antennas.

The memory circuitry 720 may include any number and type of memory devices used to provide for a given amount of system memory. As examples, the memory circuitry 720 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 720 may be developed in accordance with a Joint Electron Devices Engineering Council (JEDEC) low power double data rate (LPDDR)-based design, such as LPDDR2, LPDDR3, LPDDR4, or the like. Memory circuitry 720 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 720 may be on-die memory or registers associated with the application circuitry 705. To provide for persistent storage of information such as data, applications, operating systems and so forth, memory circuitry 720 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 700 may incorporate the three-dimensional (3D) cross-point (XPOINT) memories from Intel® and Micron®.

Removable memory circuitry 723 may include devices, circuitry, enclosures/housings, ports or receptacles, etc. used to coupled portable data storage devices with the platform 700. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 700 may also include interface circuitry (not shown) that is used to connect external devices with the platform 700. The external devices connected to the platform XT00 via the interface circuitry may include sensors 721, such as accelerometers, level sensors, flow sensors, temperature sensors, pressure sensors, barometric pressure sensors, and the like. The interface circuitry may be used to connect the platform 700 to electro-mechanical components (EMCs) 722, which may allow platform 700 to change its state, position, and/or orientation, or move or control a mechanism or system. The EMCs 722 may include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 700 may be configured to operate one or more EMCs 722 based on one or more captured events and/or instructions or control signals received from a service provider and/or various clients.

In some implementations, the interface circuitry may connect the platform 700 with positioning circuitry 745, which may be the same or similar as the positioning circuitry 645 discussed with regard to FIG. 6.

In some implementations, the interface circuitry may connect the platform 700 with near-field communication (NFC) circuitry 740, which may include an NFC controller coupled with an antenna element and a processing device.

The NFC circuitry 740 may be configured to read electronic tags and/or connect with another NFC-enabled device.

The driver circuitry 746 may include software and hardware elements that operate to control particular devices that are embedded in the platform 700, attached to the platform XT00, or otherwise communicatively coupled with the platform 700. The driver circuitry 746 may include individual drivers allowing other components of the platform 700 to interact or control various input/output (I/O) devices that may be present within, or connected to, the platform 700. For example, driver circuitry 746 may include a display driver to control and allow access to a display device, a touchscreen driver to control and allow access to a touchscreen interface of the platform 700, sensor drivers to obtain sensor readings of sensors XT21 and control and allow access to sensors 721, EMC drivers to obtain actuator positions of the EMCs 722 and/or control and allow access to the EMCs 722, a camera driver to control and allow access to an embedded image capture device, audio drivers to control and allow access to one or more audio devices.

The power management integrated circuitry (PMIC) 725 (also referred to as "power management circuitry 725") may manage power provided to various components of the platform 700. In particular, with respect to the baseband circuitry 710, the PMIC 725 may control power-source selection, voltage scaling, battery charging, or DC-to-DC conversion. The PMIC 725 may often be included when the platform 700 is capable of being powered by a battery 730, for example, when the device is included in a UE 104, 501, or 502.

In some embodiments, the PMIC 725 may control, or otherwise be part of, various power saving mechanisms of the platform 700. For example, if the platform 700 is in an RRC_Connected state, where it is still connected to the RAN node as it expects to receive traffic shortly, then it may enter a state known as Discontinuous Reception Mode (DRX) after a period of inactivity. During this state, the platform 700 may power down for brief intervals of time and thus save power. If there is no data traffic activity for an extended period of time, then the platform 700 may transition off to an RRC_Idle state, where it disconnects from the network and does not perform operations such as channel quality feedback, handover, etc. The platform 700 goes into a very low power state and it performs paging where again it periodically wakes up to listen to the network and then powers down again. The platform 700 may not receive data in this state, in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 730 may power the platform 700, although in some examples the platform XT00 may be mounted deployed in a fixed location, and may have a power supply coupled to an electrical grid. The battery 730 may be a lithium ion battery, a metal-air battery, such as a zinc-air battery, an aluminum-air battery, a lithium-air battery, and the like. In some implementations, such as in V2X applications, the battery 730 may be a typical lead-acid automotive battery.

In some implementations, the battery 730 may be a "smart battery," which includes or is coupled with a Battery Management System (BMS) or battery monitoring integrated circuitry. The BMS may be included in the platform 700 to track the state of charge (SoCh) of the battery 730. The BMS may be used to monitor other parameters of the battery 730 to provide failure predictions, such as the state of health (SoH) and the state of function (SoF) of the battery 730. The BMS may communicate the information of the battery 730 to the application circuitry 705 or other components of the platform 700. The BMS may also include an analog-to-digital (ADC) convertor that allows the application circuitry 705 to directly monitor the voltage of the battery 730 or the current flow from the battery 730. The battery parameters may be used to determine actions that the platform 700 may perform, such as transmission frequency, network operation, sensing frequency, and the like.

A power block, or other power supply coupled to an electrical grid may be coupled with the BMS to charge the battery 730. In some examples, the power block XQ28 may be replaced with a wireless power receiver to obtain the power wirelessly, for example, through a loop antenna in the computer platform 700. In these examples, a wireless battery charging circuit may be included in the BMS. The specific charging circuits chosen may depend on the size of the battery 730, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Although not shown, the components of platform 700 may communicate with one another using a suitable bus technology, which may include any number of technologies, including industry standard architecture (ISA), extended ISA (EISA), peripheral component interconnect (PCI), peripheral component interconnect extended (PCIx), PCI express (PCIe), a Time-Trigger Protocol (TTP) system, or a FlexRay system, or any number of other technologies. The bus may be a proprietary bus, for example, used in a SoC based system. Other bus systems may be included, such as an I2C interface, an SPI interface, point to point interfaces, and a power bus, among.

Figure 8:
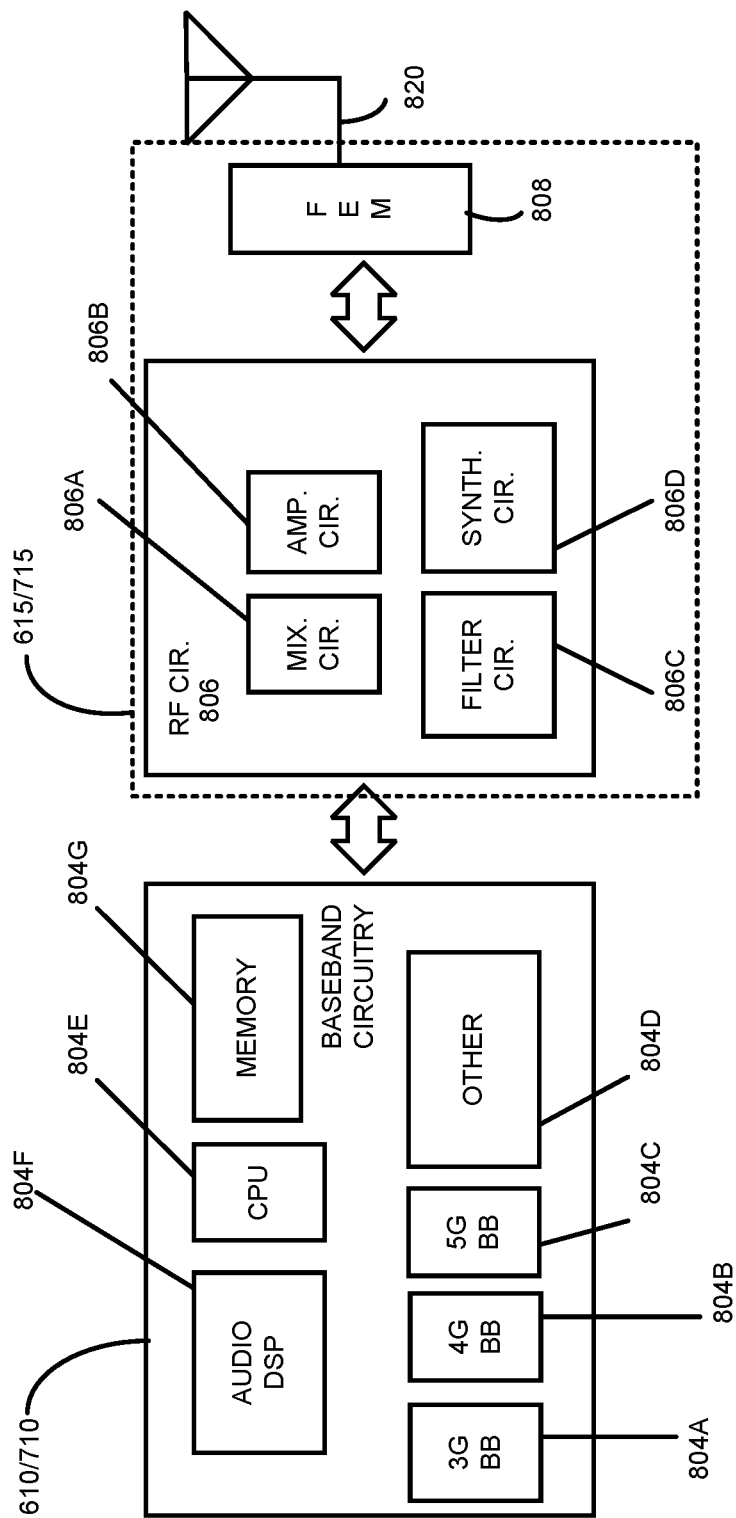
FIG. 8 illustrates example components of baseband circuitry and radio front end modules in accordance with various embodiments.

FIG. 8 illustrates example components of baseband circuitry 610/710 and radio front end modules (RFEM) 615/715 in accordance with some embodiments. As shown, the RFEM 615/715 may include Radio Frequency (RF) circuitry 806, front-end module (FEM) circuitry 808, one or more antennas 808 coupled together at least as shown.

The baseband circuitry 610/710 may include circuitry such as, but not limited to, one or more single-core or multi-core processors. The baseband circuitry 610/710 may include one or more baseband processors or control logic to process baseband signals received from a receive signal path of the RF circuitry 806 and to generate baseband signals for a transmit signal path of the RF circuitry 806. Baseband processing circuitry 610/710 may interface with the application circuitry for generation and processing of the baseband signals and for controlling operations of the RF circuitry 806. For example, in some embodiments, the baseband circuitry 610/710 may include a third generation (3G) baseband processor 804A, a fourth generation (4G) baseband processor 804B, a fifth generation (5G) baseband processor 804C, or other baseband processor(s) 804D for other existing generations, generations in development or to be developed in the future (for example, second generation (2G), sixth generation (6G), etc.). The baseband circuitry 610/710 (for example, one or more of baseband processors 804A-D) may handle various radio control functions that enable communication with one or more radio networks via the RF circuitry 806. In other embodiments, some or all of the functionality of baseband processors 804A-D may be included in modules stored in the memory 804G and executed via a Central Processing Unit (CPU) 804E. The radio control functions may include, but are not limited to, signal modulation/demodulation, encoding/decoding, radio frequency shifting, etc. In some embodiments, modulation/demodulation circuitry of the baseband circuitry 610/710 may include Fast-Fourier Transform (FFT), precoding, or constellation mapping/demapping functionality. In some embodiments, encoding/decoding circuitry of the baseband circuitry 610/710 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 610/710 may include one or more audio digital signal processor(s) (DSP) 804F. The audio DSP(s) 804F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 610/710 and the application circuitry 605/905 may be implemented together such as, for example, on a system on a chip (SoC).

In some embodiments, the baseband circuitry 610/710 may provide for communication compatible with one or more radio technologies. For example, in some embodiments, the baseband circuitry 610/710 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 610/710 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path which may include circuitry to down-convert RF signals received from the FEM circuitry 808 and provide baseband signals to the baseband circuitry 610. RF circuitry 806 may also include a transmit signal path which may include circuitry to up-convert baseband signals provided by the baseband circuitry 610/710 and provide RF output signals to the FEM circuitry 808 for transmission.

In some embodiments, the receive signal path of the RF circuitry 806 may include mixer circuitry 806a, amplifier circuitry 806b and filter circuitry 806c. In some embodiments, the transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals. Output baseband signals may be provided to the baseband circuitry 610/710 for further processing. In some embodiments, the output baseband signals may be zero-frequency baseband signals, although this is not a requirement. In some embodiments, mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 610/710 and may be filtered by filter circuitry 806c.

In some embodiments, the mixer circuitry 806a of the receive signal path and the mixer circuitry 806a of the transmit signal path may include two or more mixers and may be arranged for quadrature downconversion and upconversion, respectively. In some embodiments, the mixer circuitry 806a of the receive signal path and the mixer circuitry 806a of the transmit signal path may include two or more mixers and may be arranged for image rejection (for example, Hartley image rejection). In some embodiments, the mixer circuitry 806a of the receive signal path and the mixer circuitry 806a may be arranged for direct downconversion and direct upconversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 610/710 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806d may be a fractional-N synthesizer or a fractional N/N+1 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage controlled oscillator (VCO), although that is not a requirement. Divider control input may be provided by either the baseband circuitry 610/710 or the applications processor depending on the desired output frequency. In some embodiments, a divider control input (for example, N) may be determined from a look-up table based on a channel indicated by the applications processor 605/905.

Synthesizer circuitry 806*d* of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (for example, based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806*d* may be configured to generate a carrier frequency as the output frequency, while in other embodiments, the output frequency may be a multiple of the carrier frequency (for example, twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path which may include circuitry configured to operate on RF signals received from one or more antennas 80, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 80. In various embodiments, the amplification through the transmit or receive signal paths may be done solely in the RF circuitry 806, solely in the FEM 808, or in both the RF circuitry 806 and the FEM 808.

In some embodiments, the FEM circuitry 808 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (for example, to the RF circuitry 806). The transmit signal path of the FEM circuitry 808 may include a power amplifier (PA) to amplify input RF signals (for example, provided by RF circuitry 806), and one or more filters to generate RF signals for subsequent transmission (for example, by one or more of the one or more antennas 80).

Processors of the application circuitry and processors of the baseband circuitry 610/710 may be used to execute elements of one or more instances of a protocol stack. For example, processors of the baseband circuitry 610, alone or in combination, may be used execute Layer 3, Layer 2, or Layer 1 functionality, while processors of the baseband circuitry 610/710 may utilize data (for example, packet data) received from these layers and further execute Layer 4 functionality (for example, transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 9:
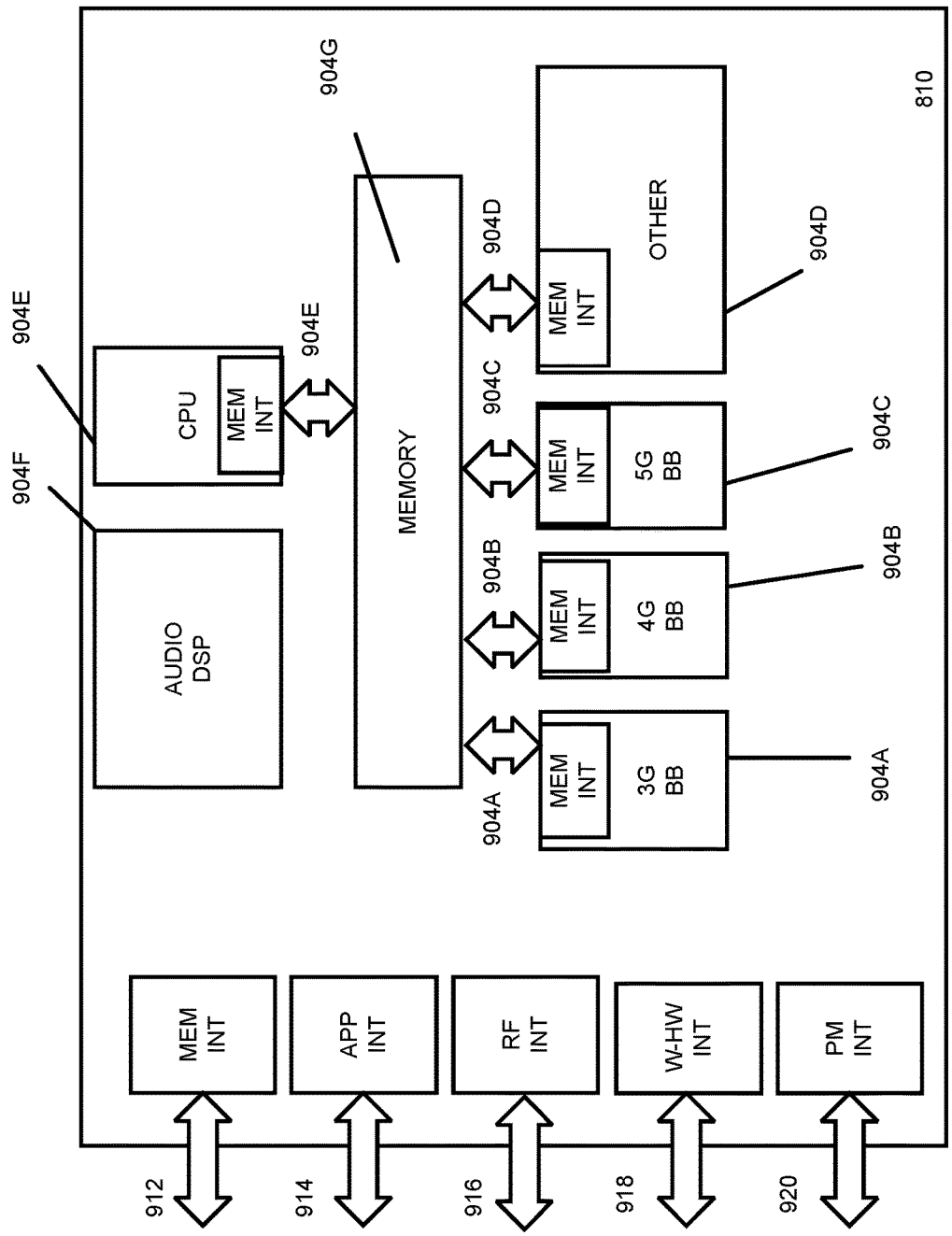
FIG. 9 illustrates example interfaces of baseband circuitry in accordance with various embodiments.

FIG. 9 illustrates example interfaces of baseband circuitry in accordance with some embodiments. As discussed above, the baseband circuitry 610/710 of FIGS. 6-8 may comprise processors 804A-804E and a memory 804G utilized by said processors. Each of the processors 804A-804E may include a memory interface, 904A-904E, respectively, to send/receive data to/from the memory 804G.

The baseband circuitry 610/710 may further include one or more interfaces to communicatively couple to other circuitries/devices, such as a memory interface 108 (for example, an interface to send/receive data to/from memory external to the baseband circuitry 610/710), an application circuitry interface 914 (for example, an interface to send/receive data to/from the application circuitry 605 of FIG. 6), an RF circuitry interface 916 (for example, an interface to send/receive data to/from RF circuitry 806 of FIG. 8), a wireless hardware connectivity interface 918 (for example, an interface to send/receive data to/from Near Field Communication (NFC) components, Bluetooth® components (for example, Bluetooth® Low Energy), Wi-Fi® components, and other communication components), and a power management interface 920 (for example, an interface to send/receive power or control signals to/from a PMIC.

Figure 10:
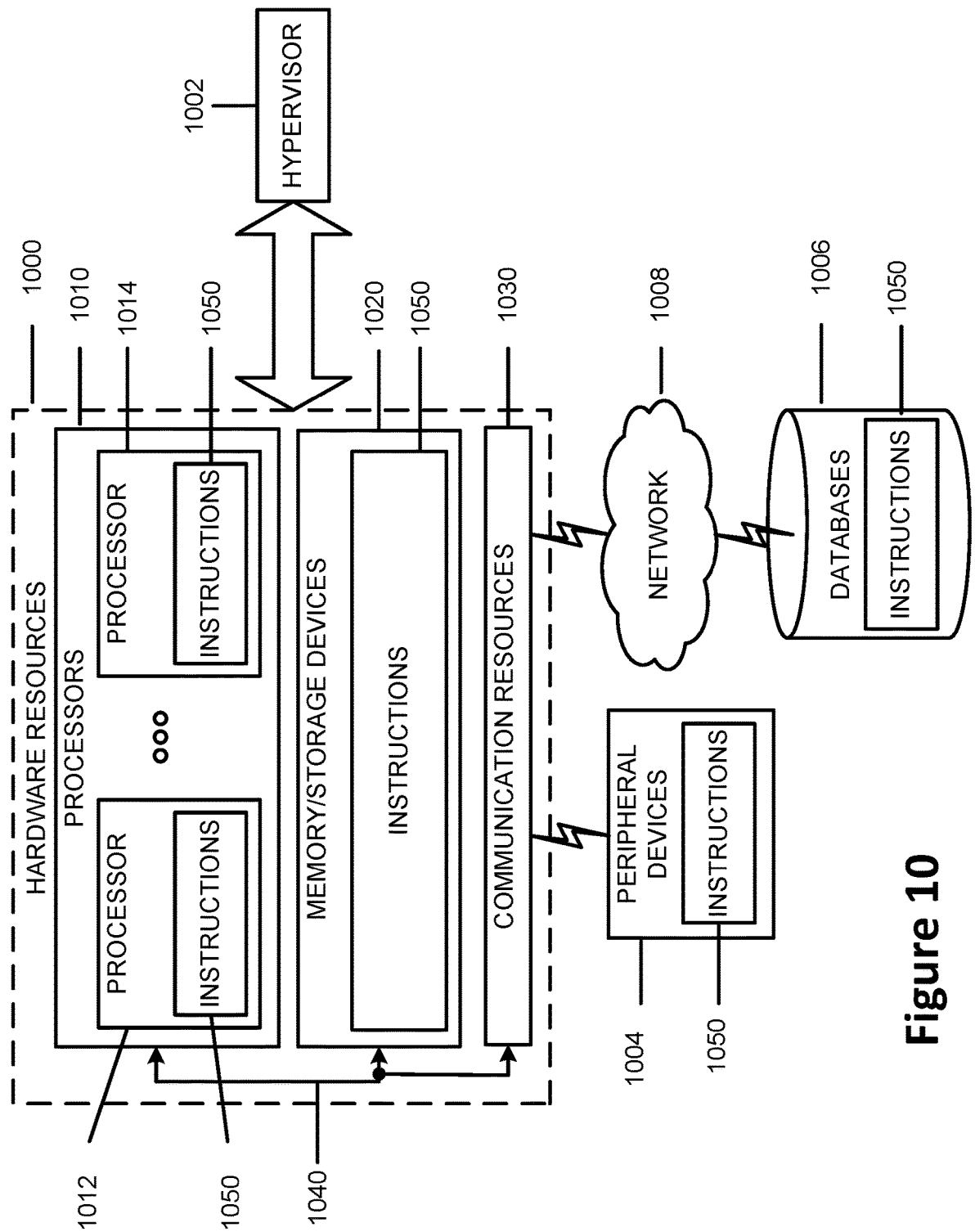
FIG. 10 is a block diagram illustrating components, according to some example embodiments, able to read instructions from a machine-readable or computer-readable medium (for example, a non-transitory machine-readable storage medium) and perform any one or more of the methodologies discussed herein.

FIG. 10 is a block diagram illustrating components, according to some example embodiments, able to read instructions from a machine-readable or computer-readable medium (for example, a non-transitory machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040. As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (for example, NFV) is utilized, a hypervisor 1002 may be executed to provide an execution environment for one or more network slices/sub-slices to utilize the hardware resources 1000. A "virtualized resource" may refer to compute, storage, and/or network resources provided by virtualization infrastructure to an application, device, system, etc.

The processors 1010 (for example, a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1012 and a processor 1014.

The memory/storage devices 1020 may include main memory, disk storage, or any suitable combination thereof. The memory/storage devices 1020 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1030 may include interconnection or network interface components or other suitable devices to communicate with one or more peripheral devices 1004 or one or more databases 1006 via a network 1008. For example, the communication resources 1030 may include wired communication components (for example, for coupling via a Universal Serial Bus (USB)), cellular communication components, NFC components, Bluetooth® components (for example, Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions 1050 may comprise software, a program, an application, an applet, an app, or other executable code for causing at least any of the processors 1010 to perform any one or more of the methodologies discussed herein. The instructions 1050 may reside, completely or partially, within at least one of the processors 1010 (for example, within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include a method of operating a UE, the method comprising: receiving, from a location management function (LMF), a request for location information; encoding, based on the request, a measurement indication or measurement gap request for transmission to a serving next generation nodeB (gNB); performing, subsequent to a transmission of the measurement indication or measurement gap request, a measurement based on the request; and encoding, based on the measurement, a report for transmission to the LMF.

Example 2 may include the method of example 1 or some other example herein, wherein the UE is to encode the measurement indication to include an indication of: a measurement gap repetition periodicity (MGRP), a measurement gap length (MGL), a measurement gap offset, a measurement gap pattern identifier, or measurement gap type.

Example 3 may include the method of example 2 or some other example herein, wherein the indication is of the measurement gap pattern identifier that is selected from 0-23.

Example 4 may include the method of example 2 or some other example herein, wherein the indication is of the measurement gap type, which is a per-UE gap a per-frequency range (FR) gap.

Example 5 may include the method of example 1 or some other example herein, wherein the UE is to encode the measurement indication to include an indication of: observed time difference of arrival (OTDOA) positioning assistance data, positioning reference signal time offset, a positioning reference signal time duration, or a positioning reference signal carrier frequency.

Example 6 may include the method of example 5 or some other example herein, wherein the indication is of OTDOA positioning assistance data that includes a positioning reference signal periodicity.

Example 7 may include the method of example 6 or some other example herein, wherein the positioning reference signal periodicity is based on a positioning reference signal configuration index.

Example 8 may include the method of example 5 or some other example herein, wherein the indication is of OTDOA positioning assistance data that includes a positioning reference signal time offset.

Example 9 may include the method of example 8 or some other example herein, wherein the positioning reference signal time offset is based on a positioning reference signal configuration index.

Example 10 may include the method of example 5 or some other example herein, wherein the indication is of OTDOA positioning assistance data that includes a positioning reference signal time duration that is based on a physical reference signal subframe number.

Example 11 may include the method of example 5 or some other example herein, wherein the indication is of OTDOA positioning assistance data that includes a positioning reference signal carrier frequency.

Example 12 may include the method of example 1 or some other example herein, wherein the UE is to encode the measurement gap request to include an indication that a purpose of a measurement gap is for a positioning measurement.

Example 13 may include the method of example 1 or some other example herein, wherein the UE is to encode the measurement gap request to include an indication a priority associated with the measurement gap request.

Example 14 may include a method of operating a user equipment, the method comprising: encoding a message to include measurement gap information or positioning reference signal (PRS) information related to a positioning measurement to be performed by the UE; and transmitting the encoded message a to serving next generation nodeB (gNB).

Example 15 may include the method of example 14 or some other example herein, wherein the message is to include an indication of: a measurement gap repetition periodicity (MGRP), a measurement gap length (MGL), a measurement gap offset, a measurement gap pattern identifier, or measurement gap type.

Example 16 may include the method of example 15 or some other example herein, wherein the message is to include an indication of: observed time difference of arrival (OTDOA) positioning assistance data, positioning reference signal time offset, a positioning reference signal time duration, or a positioning reference signal carrier frequency.

Example 17 may include the method of example 14 or some other example herein, wherein the message is a measurement gap request that includes an indication that a purpose of a measurement gap is for a positioning measurement.

Example 18 may include the method of example 14 or some other example herein, wherein the message is a measurement gap request that includes an indication of a priority associated with the measurement gap request.

Example 19 may include a method of operating a gNB, the method comprising: receiving, from a user equipment (UE), positioning information that includes inter-radio access technology (RAT) observed time difference of arrival (OTDOA) or reference signal time difference (RSTD) information; and configuring, based on the positioning information, a measurement gap for the UE to perform positioning measurements.

Example 20 may include the method of example 19 or some other example herein, further comprising providing a new radio standalone cell.

Example 21 may include the method of example 19 or some other example herein, wherein the OTDOA or RSTD information includes an indication of a carrier frequency.

Example 22 may include the method of example 19 or some other example herein, wherein the OTDOA or RSTD information includes an indication of a positioning reference signal offset or a gap offset.

Example 23 may include the method of example 19 or some other example herein, wherein the instructions, when executed, cause the gNB to configure the UE with a measurement gap repetition period of 40 milliseconds and a measurement gap length of 6 milliseconds for an inter-RAT RSTD positioning measurement.

Example 24 may include the method of example 19 or some other example herein, wherein the instructions, when executed, cause the gNB to configure the UE with a gap pattern based on a gap pattern indication within the positioning information.

Example 25 may include the method of example 19 or some other example herein, wherein the instructions, when executed, cause the gNB to prioritize reservation of resources for the measurement gap for the positioning measurements over other UE activities.

Example 26 may include one or more non-transitory computer-readable media comprising instructions to cause an electronic device, upon execution of the instructions by one or more processors of the electronic device, to perform one or more elements of a method described in or related to any of examples 1-25, or any other method or process described herein.

Example 27 may include an apparatus comprising logic, modules, or circuitry to perform one or more elements of a method described in or related to any of examples 1-25, or any other method or process described herein.

Example 28 may include a method, technique, or process as described in or related to any of examples 1-25, or portions or parts thereof.

Example 29 may include an apparatus comprising: one or more processors and one or more computer readable media comprising instructions that, when executed by the one or more processors, cause the one or more processors to perform the method, techniques, or process as described in or related to any of examples 1-25, or portions thereof.

Example 30 may include a signal as described in or related to any of examples 1-25, or portions or parts thereof.

Example 31 may include a signal in a wireless network as shown and described herein.

Example 32 may include a method of communicating in a wireless network as shown and described herein.

Example 33 may include a system for providing wireless communication as shown and described herein.

Example 34 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. An apparatus to be employed in a user equipment (UE), the apparatus comprising:
   interface circuitry to receive, from a location management function (LMF), a first positioning protocol message that requests location information; and
   processing circuitry, coupled with the interface circuitry to:
      encode, based on the first positioning protocol message, a measurement indication or measurement gap request for transmission to a serving next generation nodeB (gNB);
      perform, subsequent to a transmission of the measurement indication or measurement gap request, a measurement based on the first positioning protocol message, wherein the measurement is based on a parameter of the measurement indication or measurement gap request; and
      encode, based on the measurement, a second positioning protocol message for transmission to the LMF.

2. The apparatus of claim 1, wherein the processing circuitry is to encode the measurement indication or measurement gap request to include an indication of a carrier frequency for which the UE is to perform the measurement.

3. The apparatus of claim 1, wherein the processing circuitry is to encode the measurement indication or measurement gap request to include an indication of a gap offset in which the UE is to perform the measurement.

4. The apparatus of claim 3, wherein the processing circuitry is to further encode the measurement indication or measurement gap request to include an indication of a carrier frequency for which the UE is to perform the measurement,
   wherein the measurement is a reference signal time difference (RSTD) measurement based on a positioning reference signal transmitted on the carrier frequency within a measurement gap indicated by the gap offset.

5. The apparatus of claim 1, wherein the measurement is an inter-radio access technology reference signal time difference measurement.

6. The apparatus of claim 1, wherein the processing circuitry is to encode the measurement indication or measurement gap request to include an indication of a measurement gap repetition periodicity (MGRP); a measurement gap length (MGL); or a measurement gap pattern identifier.

7. The apparatus of claim 6, wherein the indication is of the measurement gap pattern identifier that is selected from 0-23.

8. The apparatus of claim 1, wherein the processing circuitry is to encode the measurement indication or measurement gap request to include an indication of a measurement gap type.

9. One or more non-transitory, computer-readable media having instructions that, when executed, cause a user equipment (UE) to:
- identify a request, from a location management function (LMF), to perform a positioning measurement;
- encode, based on the request, a message to include positioning reference signal (PRS) information related to the positioning measurement to be performed by the UE; and
- transmit the message to a serving next generation nodeB (gNB).

10. The one or more non-transitory, computer-readable media of claim 9, wherein the message includes an indication of a carrier frequency on which the UE is to perform the positioning measurement.

11. The one or more non-transitory, computer-readable media of claim 9, wherein the message includes an indication of a gap offset in which the UE is to perform the measurement.

12. The one or more non-transitory, computer-readable media of claim 11, wherein the message includes an indication of a carrier frequency for which the UE is to perform the measurement and the positioning measurement is a reference signal time difference (RSTD) measurement based on a PRS transmitted on the carrier frequency within a measurement gap indicated by the gap offset.

13. The one or more non-transitory, computer-readable media of claim 9, wherein the positioning measurement is an inter-radio access technology reference signal time difference (RSTD) measurement.

14. One or more non-transitory, computer-readable media having instructions that, when executed, cause a next generation nodeB (gNB) to:
- receive, from a user equipment (UE), positioning information that includes inter-radio access technology (RAT) reference signal time difference (RSTD) information; and
- configure, based on the positioning information, a measurement gap for the UE to perform positioning measurements.

15. The one or more non-transitory, computer-readable media of claim 14, wherein the gNB is to provide a new radio standalone cell.

16. The one or more non-transitory, computer-readable media of claim 14, wherein the RSTD information includes an indication of a carrier frequency on which the UE is to perform positioning measurements.

17. The one or more non-transitory, computer-readable media of claim 14, wherein the RSTD information includes an indication of a requested gap offset for a measurement gap in which the UE is to perform the positioning measurements.

18. A user equipment (UE) comprising:
- means for transmitting, based on a request from a location management function (LMF), a measurement indication or measurement gap request to a serving next generation nodeB (gNB);
- means for performing, subsequent to transmitting of the measurement indication or measurement gap request, a measurement based on the request, wherein the measurement is based on a parameter of the measurement indication or measurement gap request; and
- means for transmitting, based on the measurement, a measurement report to the LMF.

19. The UE of claim 18, wherein the measurement indication or measurement gap request includes an indication of a carrier frequency for which the UE is to perform the measurement.

20. The UE of claim 18, wherein the measurement indication or measurement gap request includes an indication of a gap offset in which the UE is to perform the measurement.

21. The UE of claim 20, wherein the measurement indication or measurement gap request further includes an indication of a carrier frequency for which the UE is to perform the measurement, and the measurement is a reference signal time difference (RSTD) measurement based on a positioning reference signal transmitted on the carrier frequency within a measurement gap indicated by the gap offset.

22. The UE of claim 18, wherein the measurement is an inter-radio access technology reference signal time difference measurement.

* * * * *